(12) United States Patent
Fujii et al.

(10) Patent No.: US 6,411,464 B1
(45) Date of Patent: Jun. 25, 2002

(54) MAGNETIC HEAD INCLUDING SLIDING MEMBER HAVING BEARING SURFACE FORMED OF PROTRUSIONS WITH ALMOST FLAT TIPS

(75) Inventors: Hiromitsu Fujii, Otsu; Takehiko Namekata, Kobe; Shin Yokouchi, Takatsuki; Katsuhiro Nakamura, Higashiosaka, all of (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/508,639

(22) PCT Filed: Jul. 23, 1999

(86) PCT No.: PCT/JP99/03945

§ 371 (c)(1),
(2), (4) Date: Mar. 15, 2000

(87) PCT Pub. No.: WO00/05711

PCT Pub. Date: Feb. 3, 2000

(30) Foreign Application Priority Data

| Apr. 1, 1997 | (JP) | 11-94775 |
| Jul. 24, 1998 | (JP) | 10-225428 |
| Nov. 25, 1998 | (JP) | 10-334498 |
| Aug. 31, 1999 | (JP) | 10-262399 |

(51) Int. Cl.$^7$ ................................................ G11B 5/60
(52) U.S. Cl. ................ 360/122; 360/235.2; 360/235.3; 360/236.6
(58) Field of Search ........................... 360/236.6, 122, 360/235.1–235.3

(56) References Cited

U.S. PATENT DOCUMENTS

| 5,010,429 A | 4/1991 | Taguchi et al. .......... 360/236.6 |
| 5,695,387 A | 12/1997 | Moravec et al. .............. 451/56 |
| 5,774,303 A * | 6/1998 | Teng et al. .............. 360/236.6 |
| 5,833,871 A * | 11/1998 | Matsushita et al. ........... 216/22 |
| 6,268,978 B1 * | 7/2001 | Tani et al. .................. 360/135 |

FOREIGN PATENT DOCUMENTS

EP 0257 593 3/1988

OTHER PUBLICATIONS

Patent Abstracts of Japan, vol. 015, No. 103 (P–1178) Mar. 12, 1991 of JP 02310869 (Hitachi Metals Ltd.) Dec. 26, 1990, entitled "Production of Floating Type Magnetic Head".
Patent Abstracts of Japan, vol. 1996, No. 06, Jun. 28,1996 of JP 08 036852 (Minebea Co. Ltd.) Feb. 6, 1996,. entitled "Surface Finishing Method of Floating Magnetic Head".

* cited by examiner

*Primary Examiner*—Jefferson Evans
(74) *Attorney, Agent, or Firm*—Dykema Gossett PLLC (57) ABSTRACT

A magnetic head and production method with excellent productivity with which a surface with fine irregularities is formed only on the bearing surface of the sliding member facing the magnetic recording medium to form a fine air flow path without changing the properties of the smooth surface of the core member that has been finish polished. The sliding properties and the magnetic properties can be improved with no damage to the magnetic recording medium by this surface with fine irregularities. By the present invention, fine irregularities are formed in the bearing surface of the sliding member and the tips of each protrusion in the surface with fine irregularities are almost flat without any change whatsoever in the properties of the smooth surface of the core member, which has been finish polished until the lapping residue layer was removed, by chemical etching using an etching solution made from a an aqueous solution including oxidizer, acid and alkali after the magnetic head has been assembled and the sliding surface of a core material and sliding member that face the magnetic recording medium have been polished to an average surface roughness Ra of, for instance, 2.0 nm or less, and as a result, the flow of air between the sliding member and the recording medium during sliding can be improved.

14 Claims, 3 Drawing Sheets

MAGNETIC HEAD INCLUDING SLIDING MEMBER HAVING BEARING SURFACE FORMED OF PROTRUSIONS WITH ALMOST FLAT TIPS

TECHNICAL FIELD

The present invention pertains to magnetic heads that are used as contact-type or floating-type structures with respect to magnetic recording media, such as floppy disks, hard disks, and the like. [The characterizing feature of the present invention is that a surface with fine irregularities, where only the tip of the protrusions at the surface of the bearing surface facing a magnetic recording medium of a sliding member comprising polycrystalline nonmagnetic ceramics is an almost a flat surface, is formed by chemical etching using an etching solution with a needed composition without altering the properties of the smooth surface of the core member that has been finished by polishing. The present invention presents a magnetic head and a production method of good productivity with which improvement of sliding performance with no damage to the magnetic recording medium is expected and the smooth surface of the core member is maintained and there is no deterioration of electromagnetic properties.]

BACKGROUND ART

In addition to floppy disks (FD) of conventional recording capacity, large-capacity, high-density floppy disks are now being used as a result of improved recording media and large-capacity floppy disks exceeding 100 MB are being developed.

The mirror finish of the bearing surface has been very important to electro-magnetic properties of contact-type magnetic heads used in FD drives in the past, but when used, there are problems in that there is an increase in the turning load of the recording medium, an adsorption phenomenon is seen, etc. In order to prevent this adsorption, etc.,(sticking), it is necessary to increase driving torque. However, the above-mentioned problems have become more obvious because low-torque motors are being used today to conserve electricity.

Polycrystalline nonmagnetic ceramics, such as CaO—$TiO_2$ systems, AlTiC systems, MnO—NiO systems, $CaTiO_3$—NiO systems, CaO—MgO—$TiO_2$ systems, CaO—MgO—$TiO_2$—$SiO_2$ systems, CaO—MgO—$TiO_2$—$SiO_2$—$Al_2O_3$ systems, etc., are being used for the sliding member of magnetic heads today in order to improve electromagnetic properties in response to the increase in density.

Moreover, the bearing surface facing the disk of a floating-type magnetic head, which has a structure whereby the disk floats as it turns at high speed and is used in hard disk drives (HDD), etc., must have a mirror finish to a higher accuracy and its floating performance must be guaranteed. However, an adsorption phenomenon between the disk and the bearing surface of the magnetic head that come into contact when the drive stops, or so-called sliding performance problems, develop when the mirror finish is more perfect and as a result, the CSS properties of the magnetic head are diminished.

In short, if the bearing surface, which is the face of the magnetic head that faces the recording medium, is polished to a mirror finish to the point that the lapping residue layer produced by the previous process is all but completely removed, there will be problems with the above-mentioned adsorption, etc., on contact.

Various structures, such as a structure where a core member is inserted into the sliding member or a structure where the core member is attached to or buried in the sliding member, are used for the magnetic head. All conventional structures use the following 2 methods to prevent the above-mentioned problems with adsorption, etc., for the purpose of realizing both good electrical properties and sliding performance. That is, the method has been used whereby the bearing surface of the sliding member and the core member of a magnetic head that face the magnetic recording medium are simultaneously polished to such an extent that the above-mentioned adsorption does not occur when they are polished to a mirror finish, or only the bearing surface of the sliding member is roughed to a certain extent after the above-mentioned polishing to a mirror finish.

Moreover, Japanese Patent Publication No.04-34203 presents a method whereby once the bearing surface of a sliding member made from Mn—Zn ferrite or Ni—Zn ferrite has been polished to a mirror finish, reactive ion etching is performed to obtain the desired rough surface. Furthermore, Japanese Patent Laid-Open No.02-276074 presents a method whereby after the sliding surface of a sliding member made of Mn—Zn ferrite has been given a mirror finish, reverse sputtering is performed to make pits that are 50 to 100 A deep. However, this means cannot be used on polycrystalline nonmagnetic ceramics materials, and the above-mentioned long procedure time and poor productivity are problems.

Japanese Patent Laid-open No.02-310869 presents a method whereby the bearing surface or a sliding member made from a magnetic ceramics such as Mn—Zn ferrite, Ni—Zn ferrite, etc., is roughed with a hydrochloric acid etching solution. Since both the sliding member and the core member are roughed, there are problems with this method in that a lapping residue layer is made, there are defects and scratches made in the core junction, leading to deterioration of the magnetic properties, and it takes time to align the head at the core junction, resulting is poor productivity.

Furthermore, Japanese Patent Laid-open No.08-36852 presents a method whereby the bearing surface of the sliding member made from a non-magnetic ceramics such as $CaTiO_3$ or AlTiC, etc., is treated with an aqueous etching solution comprising oxidizing agent and acid or oxidizing agent and alkali so that this bearing surface is roughed without simultaneously eroding the core member with a mirror finish.

A simple device is used and therefore productivity is good with the above-mentioned method of etching with an aqueous solution comprising an oxidizing agent and acid or oxidizing agent and alkali. However, since the bearing surface that faces the magnetic recording medium that is obtained has a rough surface with irregularities that have sharp peaks and deep crevices, the tip of these protrusions being the sharp peaks, there are problems in that the magnetic recording medium is easily damaged and improvement of good sliding properties without obtaining sufficient air flow is undesirable. In particular, there is a problem in that the etching solution, which consists of an aqueous solution comprising oxidizing agent and alkali, dissolves the non-magnetic ceramics component, and etching performance therefore is easily saturated.

SUMMARY OF THE INVENTION

The purpose of the present invention is to provide a magnetic head with both good electro-magnetic properties and sliding performance. Moreover, another purpose of the present invention is to give the bearing surface facing the magnetic recording material a mirror finish until the lapping residue layer made by the previous processes can be all but completely removed and then to form a surface with fine irregularities at only the bearing surface facing the magnetic recording medium of the sliding member in order to make a fine air flow path altering the properties of the smooth surface of the above-mentioned core member that has been finished by polishing. Another purpose of the present invention is to present a magnetic head and a production method of excellent productivity with which improvement of sliding performance and improvement of magnetic properties can be realized because the surface with fine irregularities that has been formed will not damage the magnetic recording medium.

The inventors felt that it was necessary to have good air flow between the recording medium and magnetic head during sliding in order to improve sliding performance. They further felt that in order to realize this good air flow, it was necessary to improve the cross section shape in the direction of depth at the bearing surface of the sliding member. Consequently, they felt that although the tips of the protrusions forming the rough surface with irregularities of the sliding member of conventional heads are sharp peaks relative next to deep crevices with respect to the magnetic recording medium, the tips of these protrusions should be an almost flat surface.

The inventors performed various studies of etching solution compositions that would make it possible to form a surface with fine irregularities where the tips of the protrusions of the bearing surface of the sliding member are almost flat in order to form a fine air flow path, and as a result they discovered that etching properties vary between phases when the material is a mixture of at least 2 compound phases, such as a $CaO$—$TiO_2$ polycrystalline nonmagnetic ceramics. The inventors performed further studies and found that the tips of the protrusions in the bearing surface of the sliding member will be sharp peaks if the etching solution is an aqueous solution comprising an oxidizing agent and an alkali, and the junction of the magnetic core is markedly corroded by an aqueous solution comprising an oxidizing agent and an acid, but the tips of the protrusions can be made an almost flat surface and the surface of the core member that has been finished by polishing is unaltered with an etching liquid consisting of an aqueous solution comprising oxidizing agent and acid and alkali.

The inventors discovered that since the problems of adsorption between the sliding member and the magnetic recording medium at the bearing surface, etc., can be solved by the above-mentioned etching of the present invention, it is possible to give the bearing surface even more of a mirror finish and to completely remove the lapping residue layer of the core member in order to improve the properties of the magnetic head.

That is, the present invention is characterized in that the bearing surface facing the magnetic recording medium of a sliding member consisting of poycrystalline nonmagnetic ceramics, particularly polycrystalline nonmagnetic ceramics made from at least 2 or more compound phases with different etching properties, is etched with an etching solution consisting of an aqueous solution comprising oxidizing agent and acid and alkali after this bearing surface is polished to a mirror finish together with the core member to such an extent that the lapping residue layer on the core member can be all but completely removed.

The present invention makes possible specific surface modification by the above-mentioned etching, that is, formation of a bearing surface made from a surface with fine irregularities where the tips of the protrusions in the sliding member are an almost flat surface, but retaining the mirror finish of the core member and the realization of good electro-magnetic properties and sliding performance.

The inventors performed further studies in order to efficiently perform the above-mentioned chemical etching and focused on the fact that etching is not simply a reaction between ceramics and each chemical, but rather several parallel reactions, feeling that promoting only the effective reaction and inhibiting the reactions that are unnecessary or have the opposite effect or disrupt the effective reaction system are indispensable to improving the chemical reaction rate of etching, minimizing fluctuations in the reaction and making the reaction stable.

Therefore, as a result of various studies of etching solution compositions, the inventors discovered that generating efficiency of the desired surface modification is improved and this etching reactions can be controlled when etching is performed using an etching solution, selected for a specific surface modification of a needed ceramics, that contains a required amount of chelating reagent and the cations that are generated during etching will be trapped in the solution (chelation).

Moreover, the inventors studied suitable ceramics in order to more efficiently make the tip of each protrusion of the rough surface with irregularities almost a flat surface using the fact that there is a difference in etching performance between the phases of the above-mentioned materials that are mixtures of at least 2 types of compound phases. As a result, they discovered that a ceramics that is a mixture of at least 2 compound phases with efficaciously different etching properties can be obtained and the desired magnetic head can be produced by controlling the mean grain particle diameter of each raw material, the diffusing component that will diffuse and the component to which the diffusing component will diffuse during pre-baking and sintering, as needed by means of production of ceramics by the powder metallurgy technique.

That is, the present invention is a method of producing a magnetic head, characterized in that by means of a production method that consists of conventional powder metallurgy means, that is, processes involving mixing, pre-baking, crushing, molding, sintering, etc., the nonmagnetic ceramics are made from such the starting powders, consisting of at least raw material A as a diffusing component that diffuses during heating and raw material B as a component to which the diffusing component will diffuse during heating, wherein the average grain particle diameter of raw material A is greater than that of raw material B, preferably greater by 2-fold or more, is made into a ceramics for sliding members of magnetic heads by powder metallurgy.

BEST MODE FOR CARRYING OUT THE INVENTION

Any conventional structure where the core member and sliding member face the magnetic recording medium, such as a structure that is assembled so that the core member is inserted into the sliding member, the structure where a sliding member is attached at a specific position, the structure where a sliding member is buried in a specific. place, etc., can be used for the structure of the magnetic head of the present invention, and the core member is also selected as needed in accordance with the above-mentioned structure and sliding member material, etc.

Figure 1A:
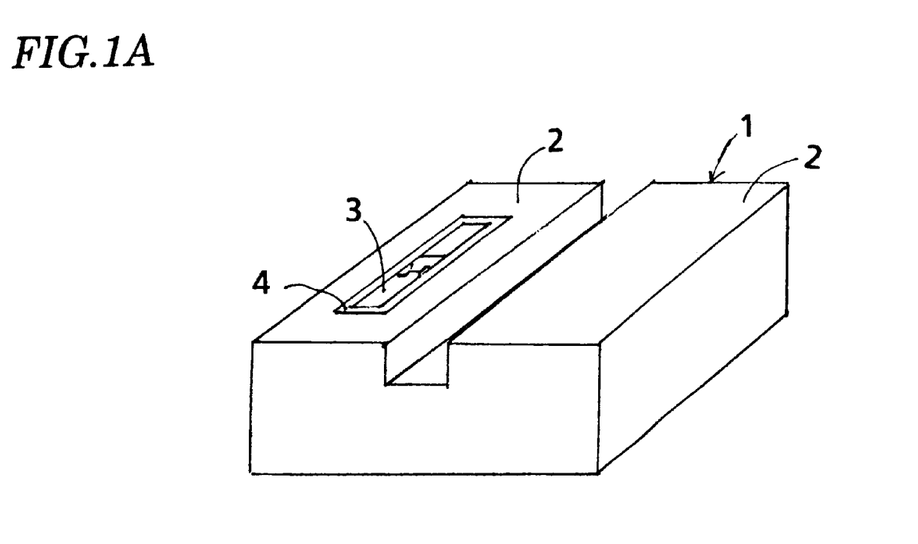
FIG. 1A is an oblique diagram showing an example of the structure of the magnetic head of the present invention and FIG. 1B is a profile diagram.

When an example of the processes of making a magnetic head is described, the desired indentation or hole is made in sliding surface 2 of block-shaped sliding member 1 of the magnetic head in FIG. 1A and core member 3 that has been assembled as desired is fastened inside these indentations or holes with fixing agent 4 so that the surface of the core member that faces the recording medium is seen.

When sliding member 1 and core member 3 are completely fastened together, bearing surface 2 is ground to remove an amount of, for instance, 100 to 200 $\mu$m, so that the surface of core member 3 that faces the recording medium will be the same height as bearing surface 2. After this grinding, rough lapping to remove an amount of 10 to 50 $\mu$m is performed using diamond abrasive grains with a relatively large particle diameter as the free abrasive grains and then finish lapping is performed to remove an amount of, for instance, several $\mu$m, using fine diamond abrasive grains as the free abrasive grains. As a result, the product is finish polished to a surface roughness, that is, mean roughness Ra, of 3.0 nm or less. Then chemical etching is performed by means of the present invention.

Any conventional method can be used for grinding and polishing of the bearing surface in the present invention. For instance, lapping and polishing using diamond abrasive grains as free abrasive grains, mechanochemical polishing, tape lapping whereby fine diamond abrasive grains are used as stationary abrasive grains, mirror polishing, such as electrolytic polishing, etc., can be used.

Furthermore, lapping using diamond abrasive grains as free grains uses simple equipment and has excellent working accuracy and efficiency. The first rough lapping should be performed using a mean particle diameter of 2 to 6 $\mu$m and the second finish lapping should be performed with a mean particle diameter of 0.5 $\mu$m or less, preferably 0.15 $\mu$m or less.

Average roughness Ra of the core member should be a finish polish to 3.0 nm or less, preferably 2.0 nm or less, and 1.0 nm or less is further preferred because there is a chance that a lapping residue layer that has been formed by the previous process will remain. That is, surface roughness after polishing Ra should be a finish polish to 0.1 to 2.0 nm with the lapping residue layer of the previous processes being completely removed.

The above-mentioned polycrystalline nonmagnetic ceramics made from at least 2 or more phases with different etching properties is used for the sliding member of the magnetic head that is the subject of the present invention and therefore, the tip of each protrusion in the bearing surface can be made an almost flat surface when the desired surface with fine irregularities is made by chemical etching.

A polycrystalline nonmagnetic ceramics material such as a $CaO$—$TiO_2$ system, AlTiC system, MnO—NiO system, $CaTiO_3$—NiO system, CaO—MgO—$TiO_2$ system, CaO—MgO—$TiO_2$—$SiO_2$ system, CaO—MgO—$TiO_2$—$SiO_2$—$Al_2O_3$ system, etc., can be used for the sliding member of the magnetic head that is the subject of the present invention.

Furthermore, the preferred sliding member, that is, the polycrystalline nonmagnetic ceramics material that is made from at least 2 or more phases with different etching properties, is a ceramics for the sliding member of magnetic heads that is produced by controlling as needed the mean grain particle diameter of raw material A, which has a diffusing component that diffuses with heating, and raw material B, which is the component to which the diffusing component will diffuse with heating, using powder metallurgy.

One or two or more of CaO, $Al_2O_3$, MnO, NiO, MgO and/or derivatives of the above-mentioned oxides, can be used for raw material A, which has a diffusing component that diffuses with heating, of this ceramics for sliding members, and one or two or more of $TiO_2$, $Al_2O_3$, $SiO_2$, C and/or derivatives of the above-mentioned oxides and element can be used for raw material B, which has the component to which the diffusing component will diffuse with heating (provided that raw materials A and B are not the same).

By means of the present invention, derivatives of the oxides and element can be any compound as long as, for instance, in the case of CaO, CaO is produced by heating, such as $Ca(OH)_2$, $CaCO_3$, $CaSO_4$, etc., and it does not have any effect on the final components of the above-mentioned ceramics.

For instance, several types of compounds are present in CaO—$Ti_{O2}$ ceramics whose final components are CaO and $TiO_2$, and the reaction by which these compounds are produced is promoted during the pre-baking and sintering processes of powder metallurgy means by one-way diffusion of CaO to the $TiO_2$ side through contact points where the crystal grains of CaO come into contact with the crystal grains of the $TiO_2$. Compounds are produced in succession according to the concentration gradient of CaO inside the $TiO_2$ crystal grains. However, the state of production is affected by the combined state of CaO and $TiO_2$ and thermodynamic stability of these several types of compounds during the mixing process of the powder metallurgy means.

By means of the above mentioned structure, it is estimated that if the grain particle diameter of the $TiO_2$ is smaller than the grain particle diameter of the CaO, there will be many $TiO_2$ crystal particles that will not come into contact with CaO crystal particles if there are relatively many $TiO_2$ crystal particles and as a result, the diffusing component CaO will diffuse through these $TiO_2$ crystal particles and the above-mentioned concentration gradient will be discontinuous at the contact points and therefore, the CaO concentration of each of the above-mentioned many $TiO_2$ crystal particles will have a stepped structure and thus, several compounds of this CaO—$TiO_2$ ceramics will easily be present as individual crystal particles.

In other words, when the grain particle diameter of the CaO, that is, raw material A comprising the diffusing component, is larger, preferably by 2-fold or more, than the grain particle diameter of the $TiO_2$, that is, raw material B comprising the component to which the diffusing component will diffuse, crystal particles consisting of phases of several compounds are formed in this CaO—$TiO_2$ ceramics and each of these compound phases will have different etching properties, which is ideal.

A ceramics for sliding members of magnetic heads where phases made from crystal particles of several types of compounds are mixed is obtained as previously described, and because the several compound phases have different etching properties owing to the stability of their chemical bonds, when this ceramics is used for the sliding member and etching of the sliding surface that has been given the finish of a mirror surface is performed, a rough surface with irregularities where the tip of each protrusion is almost flat can be easily formed. Consequently, there is good air flow during sliding at the bearing surface where the sliding member and magnetic recording medium face one another and improved sliding performance of ceramics used for sliding members can be realized.

By means of the present invention, above mentioned raw material A is the diffusing component and it diffuses to the crystals of the component that receives the diffusing component, raw material B, and therefore, the crystal particles of raw material B become larger by this amount of diffusion. Since this effect is more marked with a smaller raw material B grain particle diameter, a raw material B grain particle diameter of 0.1 to 10 μm is adequate for obtaining a grain particle diameter of the desired ceramics for sliding members of 1 to 10 μm.

By means of the present invention, for instance, $H_2O_2$ can be used as the oxidizer, acetic acid ($CH_3COOH$), formic acid (HCOOH), sulfuric acid ($H_2SO_4$), etc., can be used as the acid, and ammonia ($NH_3$), sodium carbonate ($Na2CO_3$), potassium carbonate ($K_2CO_3$), etc., can be used as the alkali of the etching solution that consists of an aqueous solution comprising oxidizer, acid and alkali of the present invention, and combinations of other acids and alkalis used for etching can be employed as needed.

If the composition ratio of hydrogen peroxide as oxidizer of the etching solution serves as 1, the preferred composition ratio in terms of 100% purity of acid in the aqueous solution is 0.15 to 0.4 in the case of acetic acid, 0.1 to 0.3 in the case of formic acid, and 0.25 to 0.5 in the case of sulfuric acid, and the preferred composition ratio of the alkali in the aqueous solution is 0.2 to 1.2 in the case of ammonia, 0.7 to 3.5 in the case of sodium carbonate, and 0.8 to 4.5 in the case of potassium carbonate. These composition ratios are selected as needed in accordance with the material to be etched, and in accordance with the conventional acid or alkaline solution for etching that may be added.

By means of the present invention, the preferred chemical etching conditions are selected as needed in accordance with the material to be etched, the type of etching solution, and the composition ratio of the etching solution. In particular, the abovementioned conditions are selected in accordance with the necessary characteristics of the almost flat surface when the tip of each protrusion at the surface with fine irregularities at the bearing surface of the sliding member facing the magnetic recording medium is an almost flat surface.

That is, this almost flat surface at the surface with fine irregularities in the sliding surface of the sliding member is not necessarily a perfectly flat surface and can be flat to such an extent that sliding performance can be improved with no damage to the magnetic recording medium.

Figure 1B:
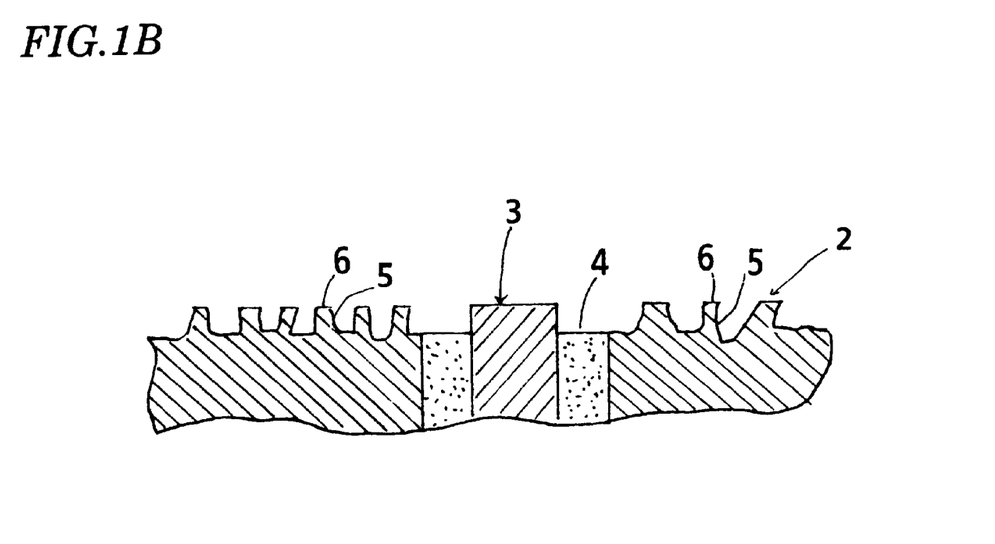

With respect to surface roughens of the core member after chemical etching, surface roughness Ra after finish polishing remains as is at, for instance, 0.1 to 2.0 nm. In contrast to this, roughness Ra of the sliding surface of the sliding member exceeds 3.0 nm and can be controlled to 50 nm and therefore, the desired fine air flow paths are formed and, as shown in the representation in FIG. 1B, surface height of core member 3 and height of almost flat surface 6 at the tip of protrusion 5 in the surface with fine irregularities of sliding surface 1 are on almost the same plane.

By means of the present invention, when the sliding surface of the above-mentioned sliding member is made a surface with fine irregularities by chemical etching and the tip of each protrusion is made into an almost flat surface, the fine irregularities can vary relatively depending on the type of polycrystalline nonmagnetic ceramics used and its crystal and compound phases.

That is, the tip of the protrusions in the surface with fine irregularities is almost flat, as shown in the examples, and the average center line roughness Ra (nm) of the entire surface can vary relatively, depending on the type of ceramics and its crystal and compound phases, so that a variety of morphologies are seen, such as the center of the abovementioned tip surface being flat with one or both edges being curved, the entire tip surface being inclined to one side, some or all of the tip surfaces having fine irregularities, etc.

In any case, the abovementioned inclination and indentations in the tips of the protrusions of the surface with fine irregularities are ½ overall height or less, preferably ⅓ overall height or less. Moreover, the ratio of the total surface area of the surface of the tip of each protrusion to the total surface area of the sliding surface of the sliding member Sa should be within a range of 10% to 70%, while the average diameter of the end of each tip of the protrusions Da should be within a range of 1 μm to 10 μm.

By means of the present invention, if the abovementioned ratio of the total surface area Sa of the surface of the tip of each protrusion to the total surface area of the sliding surface of the sliding member is less than 10%, there will be a chance that pressure applied to the magnetic recording medium by the head will be concentrated within a narrow surface area and the magnetic recording medium will be damaged, while if this ratio exceeds 70%, the air flow path will be narrow and there will be few air flow paths and therefore, air flow will be poor. Therefore, an Sa outside the above-mentioned range is undesirable. The preferred ratio is 15% to 50%.

By means of the present invention, if the average diameter at the surface of the tip of protrusions Da is less than 1 μm, there is a chance that an effective flat surface will not be obtained and that the tips will be sharp peaks that will damage the magnetic recording medium, while if this diameter exceeds 10 μm, end face shape will be diverse and there will be fluctuations in the flow path and flow of air. Therefore, a Da outside the above-mentioned range is undesirable, the preferred Da being 2 μm to 7 μm.

Moreover, by means of the present invention, efficiency of the desired surface modification can be improved by trapping cations that are generated with etching in a solution with a chelating reagent and performing etching. Therefore, the etching solution is selected from a solution containing oxidizer, a solution containing oxidizer and acid, a solution containing oxidizer and alkali, a solution containing oxidizer and acid and alkali, etc., depending on the purpose of surface modification. These solutions of etching solution and chelating reagent can be used as agents for modification of the surface of ceramics.

According to the experiments performed by the inventors, the ratio of etching solution and chemicals in the etching solution, such as oxidizer, acid, alkali, etc., should be amount of chemical/etching solution=$1 \times 10^{-2}$ to 1 (weight ratio), or the ratio of chelating reagent and etching solution should be selected from within a range of amount of chelating reagent/etching solution=$1 \times 10^{-5}$ to $10 \times 10^{-1}$ (molar concentration M).

The surface modifier consisting of etching solution and chelating reagent of the present invention can be obtained by simply controlling the chemical-solution composition as needed and shaking and mixing as needed without necessarily increasing treatment temperature or increasing concentration.

By means of the present invention, the chelating reagent is selected as needed from a variety of chemical substances taking various conditions into consideration, including the composition of the ceramics in question, the condition and extent of surface modification, the etching solution that is used, etching conditions, etc. For instance, the following chemicals form chelates from metal atoms:

Acetylacetone

Ethylenediaminetetraacetic acid (EDTA) and alkali metal salts 2,2',2"-Terpyridine Neothorin Nitrosophenylhydroxylamine $NH_4$ salt (cupferron)

Diethyldithiocarbamic acid and alkali metal salts

Thorin (also called thoron)

4,7-Diphenyl-1,10-phenanthroline (bathophenanthroline)

Bismuthiol II 1,10-Phenanthroline

Berrilon II

Oxine

Nitrilotriacetic acid and alkali metal salts 1,2-Diaminocyclohexanetetraacetic acid (CyDTA) and alkali metal salts N-Oxyethylethylenediaminetriacetic acid (HEDTA) and alkali metal salts Ethylene glycol bis(β-aminoethyl ether)tetraacetic acid (GEDTA) and alkali metal salts Ethylenediaminetetrapropionic acid (EDTP) and alkali metal salts.

EXAMPLE 1

Chemical etching was performed for 3 minutes at 50° C. on a CaO—MgO—$TiO_2$ sliding member that had been polished to a mirror finish using an etching solution that had a composition of an aqueous solution comprising hydrogen peroxide, ammonia and acetic acid and having a composition ratio in terms of 100% purity of 1:1:0.25. The center line average roughness Ra(nm) before and after etching treatment was determined.

Moreover, in order to evaluate sliding performance of a magnetic head with this sliding member, this magnetic head was brought into contact with the magnetic recording medium and starting torque was determined to confirm a reduction in starting torque T, that is, improvement of sliding performance, using a torque driver. The results are shown in Table 1.

Comparison 1

Moreover, by way of comparison, chemical etching was performed for 3 minutes at a temperature of 50° C. using an etching solution with a composition of an aqueous solution comprising hydrogen peroxide and ammonia and a composition ratio in terms of 100% purity of 10:1. Then center line average roughness Ra (nm) and starting torque T were similarly determined and are shown in Table 1.

Furthermore, the surface state of the bearing surface was checked with an AFM (intra-atomic force microscope, NanoScope 3 made by Digital Instruments).and part of the determined length L in the direction of this center line was sampled from the roughness curve that was obtained as a result. The center line of this sample served as the X axis, and its axial magnification served as the Y axis. When the roughness curve is represented as a function of y=f(x), center line average roughness Ra (nm) is represented by the following formula. Moreover, the ratio of total surface area of each tip of the protrusions to the total surface area of the sliding surface Sa and the average diameter of the surface of the tip of the protrusions Da was determined using the AFM. The determination results are shown in Table 1.

$$Ra = \frac{1}{L}\int_0^L |f(x)|\,dx$$

EXAMPLE 2

Chemical etching was performed for 3 minutes at a temperature of 30° C. on a CaO—$TiO_2$ sliding member that had been polished to a mirror finish using an etching solution with a composition of an aqueous solution comprising hydrogen peroxide, ammonia and formic acid at a composition ratio in terms of purity of 100% of 1:0.25:0.20. Center line average roughness (nm) was determined as in Example 1. A magnetic head with this sliding member was brought into contact with a magnetic recording medium and starting torque T was determined using a torque drive. The results are shown in Table 1.

TABLE 1

| | Ra(nm) | T(g · cm) | Da(μm) | Sa(%) |
|---|---|---|---|---|
| Untreated | 1.0 | 180 | — | — |
| Comparison 1 | 4.4 | 130 | 0.8 | 10 |
| Example 1 | 4.1 | 100 | 4.0 | 30 |
| Example 2 | 3.9 | 100 | 3.0 | 45 |

EXAMPLE 3

The magnetic head shown in FIG. 1A was assembled using CaO—MgO—$TiO_2$ nonmagnetic ceramics as the sliding member and Mn—Zn magnetic material as the core member and then rough lapping using fine diamond abrasive grains (average particle diameter of 3 μm) as free abrasive grains and finish lapping using fine diamond abrasive grains (average grain diameter of 0.5 μm) as free abrasive grains were performed. Center line average roughness Ra was brought to 2.0 nm.

Chemical etching was performed for 5 minutes at a temperature of 50° C. on the magnetic head that was obtained using an etching solution with a composition of an aqueous solution comprising hydrogen peroxide, ammonia and acetic acid and a composition ratio in terms of 100% purity of 1:1:0.25.

Center line average roughness Ra (nm) was determined before and after etching and in order to evaluate sliding performance of the magnetic head with this sliding member, this magnetic head was brought into contact with a magnetic recording medium and starting torque T was determined using a torque driver. The results are shown in Table 2.

Comparison 2

By way of comparison, chemical etching by keeping the ceramics at a temperature of 50° C. for 5 minutes was performed using an etching solution with a composition of an aqueous solution comprising hydrogen peroxide and ammonia and a composition ratio in terms of 100% purity of 10:1. Then center line average roughness Ra (nm) and starting torque were similarly determined and are shown in Table 2. Center line average roughness Ra (nm) was determined by the same method as in Example 1.

TABLE 2

|  | Core member Ra(nm) | Sliding member Ra(nm) | T(g · cm) | Da(µm) | Sa(%) |
|---|---|---|---|---|---|
| Untreated | 2.0 | 2.0 | 170 | — | — |
| Comparison 2 | 2.0 | 4.6 | 130 | 0.8 | 10 |
| Example 3 | 2.0 | 7.6 | 90 | 4.0 | 35 |

Table 2 confirms that starting torque T could be reduced, that is, sliding performance was improved, by Example 3 in comparison to the comparative example.

Figure 2:
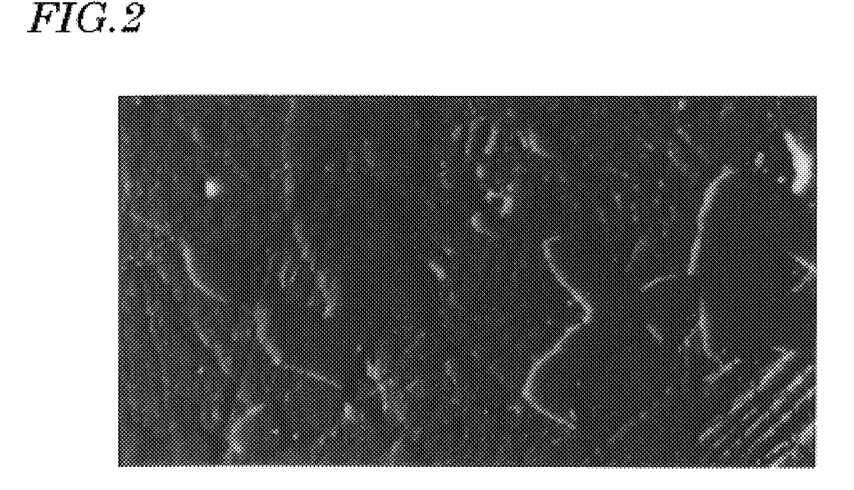
FIG. 2 is an AFM micrograph of a top view of the surface condition of the bearing surface of the sliding member of the magnetic head of the present invention.
Figure 3:
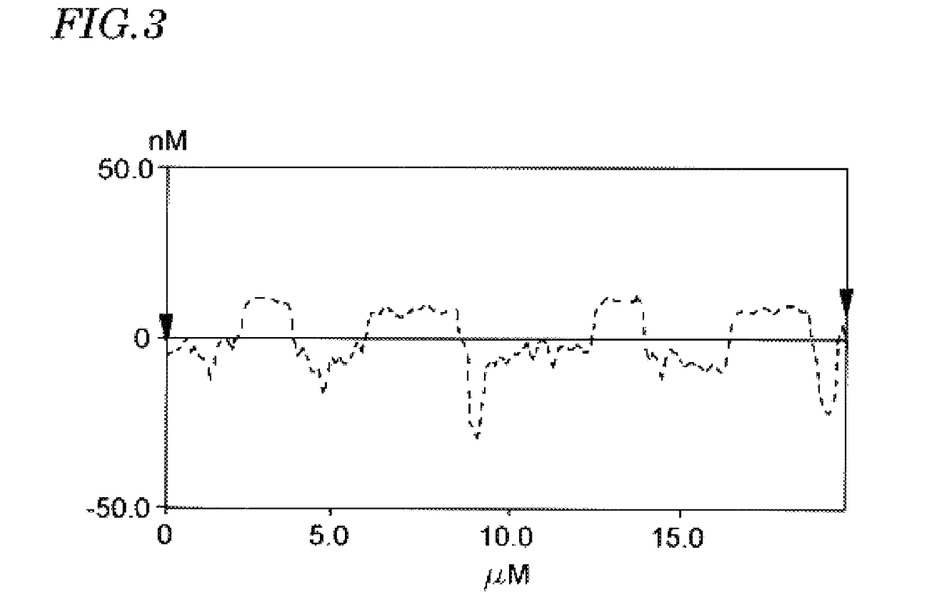
FIG. 3 is a graph of the surface height that shows the profile condition along the surface center line of FIG. 2.
Figure 4:
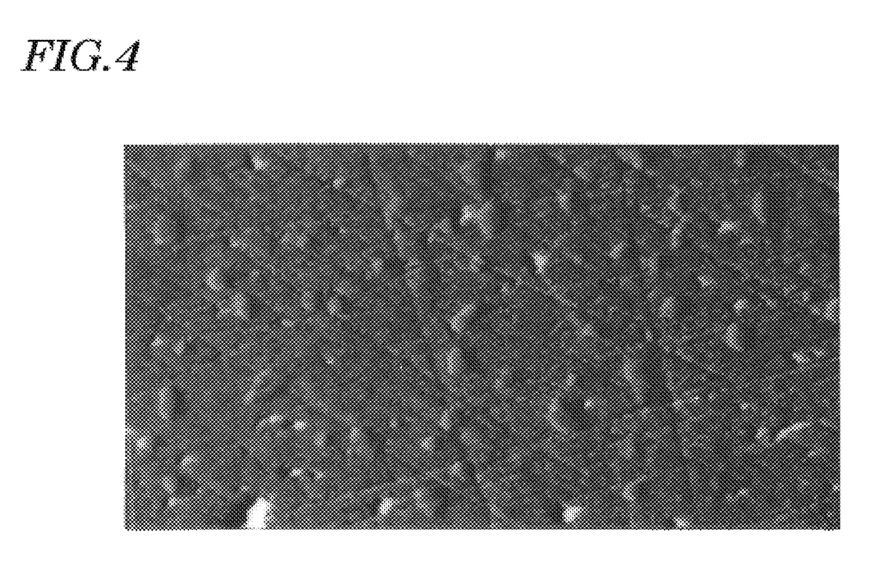
FIG. 4 is an AFM micrograph of a top view showing the surface condition of the bearing surface of the sliding member of a conventional magnetic head.
Figure 5:
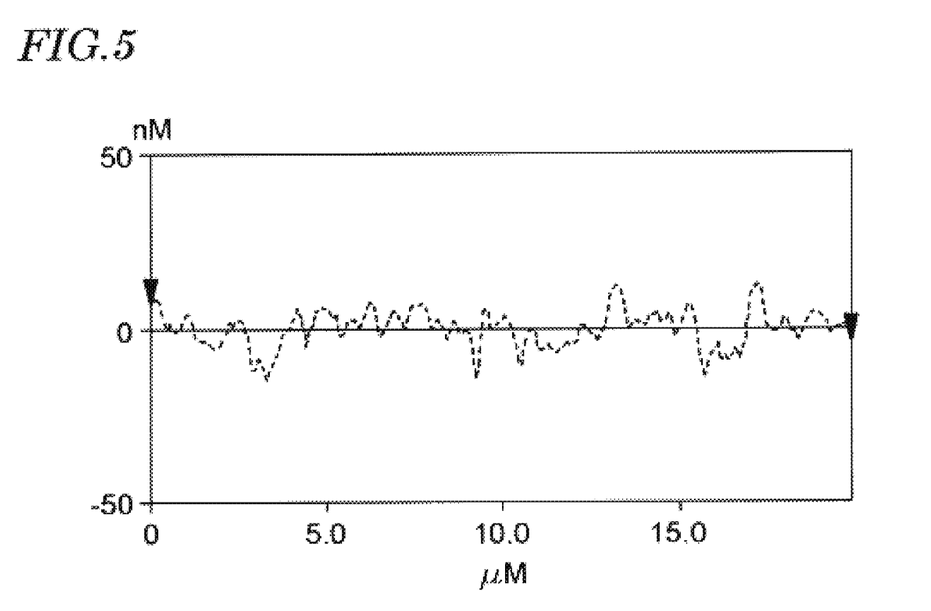
FIG. 5 is a graph of surface height that shows the profile surface condition at the center line of the surface in FIG. 4.

Moreover, the sample in Example 3 and the Comparative Example were observed with an AFM and a micrograph of the top surface showing the surface state (vertical width of the strip in the figure is 10 µm) and the graph of surface height showing the profile state of the surface center line (center of this vertical width) are shown in FIGS. 2 and 3 for Example 3 and FIGS. 4 and 5 for the Comparative Example. The surface of Example 3 is made from grooves between flat island (monadnock) and flat island (monadnock) and it is clear that the flatness of the islands (monadnocks) and height of each island (monadnock) is quite uniform. On the other hand, it is clear that the Comparative Examples is wide spaces between small islands and there are many small islands that are sharp peaks, with the height of the sharp peaks being non-uniform.

EXAMPLE 4

The magnetic head in FIG. 1A was assembled using a CaO—TiO$_2$ nonmagnetic ceramics for the sliding member and an Mn—Zn magnetic material for the core member and rough lapping with fine diamond abrasive grains (average particle diameter of 3 µm) as free grains and finish lapping with fine diamond abrasive grains having the particle diameter in Table 3 (average particle diameter µm) as free abrasive grains were performed.

Then chemical etching for 3 minutes at a temperature of 50° C. was performed on the magnetic head that was obtained using an etching solution with a composition of an aqueous solution comprising hydrogen peroxide, ammonia and acetic acid and a composition ratio in terms of 100% purity of 1:0.5:0.2. The Ra after chemical etching is shown in Table 3.

Moreover, by way of comparison, the Ra of an untreated example that had not been etched and of a sample treated by conventional roughing using diamond abrasive grains after the abovementioned finish lapping is shown in Table 3.

By means of the chemical etching method of the present invention, the bearing surface of the core member retains almost the same surface roughness after etching as before etching and only the surface roughens after etching of the bearing surface of the sliding member increases in Examples 4-1 through 4-3, wherein a surface with fine irregularities is formed on the almost flat surface at the tip of the protrusions in the sliding surface of the sliding members.

TABLE 3

|  | Diamond abrasive grains Average particle diameter (µm) | Core member Ra(nm) Before etching | Core member Ra(nm) After etching | Sliding member Ra(nm) Before etching | Sliding member Ra(nm) After etching |
|---|---|---|---|---|---|
| Example4-1 | 0.15 | 0.5 | 0.5 | 0.5 | 8.0 |
| Example4-2 | 0.3 | 1.0 | 1.0 | 1.0 | 8.0 |
| Example4-3 | 0.5 | 2.0 | 2.0 | 2.0 | 8.0 |
| Untreated example | 0.5 | 2.0 |  | 2.0 |  |
| Conventionally roughed sample | 3 | 6.0 |  | 6.0 |  |

EXAMPLE 5

The magnetic properties (output, resolution) as well as sliding performance of the magnetic heads obtained in Example 4 were determined and are shown in Table 4. All of the magnetic heads in Examples 4-1 through 4-3 had the same or better electric properties than the untreated sample that was not etched, and sliding properties were all markedly improved over the untreated and conventionally roughed samples.

TABLE 4

|  | Output (%) | Resolution (%) | Starting torque (g · cm) |
|---|---|---|---|
| Example 4-1 | 105 | 105 | 90 |
| Example 4-2 | 103 | 103 | 90 |
| Example 4-3 | 100 | 100 | 90 |
| Untreated sample | 100 (reference) | 100 (reference) | 170 |
| Conventionally roughed sample | 95 | 93 | 100 |

EXAMPLE 6

Surface modification of the ceramics in Table 5 that had been polished to a mirror finish was performed for 3 minutes at a temperature of 50° C. using a surface modifier consisting of the etching solution in Table 5 and the chelating reagent in Table 6. In order to evaluate the extent of surface modification, center line average roughness Ra (nm)before and after surface modification are shown in Table 6. Center line average roughness Ra (nm) was determined by the same method as in Example 1.

Comparison 3

By way of comparison, the Ra (nm) when treatment was performed as in Example 6, with the exception that chelating reagent was not contained in the modifier, was determined and is shown in Table 5. Here the ○ in the table show before surface modification and the ● show the comparative examples. The etching solution was an aqueous solution comprising various chemicals and was prepared so that chemicals comprising the solution would be at the composition ratio shown in parentheses in terms of a purity of 100%. The composition ratio of the chelating reagent, as well as the chemicals that were used and the etching solution, are shown in parentheses.

It is clear from Tables 5 and 5 that there is marked improvement in the Ra with the surface modifier of the present invention that contains chelating reagent in comparison to surface modification with an etching solution only, that is, the Ra of the Comparative Example.

TABLE 5

| No. | | Ceramics material | Etching Solution |
|---|---|---|---|
| 6-1 | ○ | CaO—MgO—TiO$_2$ ceramics | — |
| 6-2 | ● | CaO—MgO—TiO$_2$ ceramics | Hydrogen peroxide (1), acetic acid (0.3), ammonia (0.8) |
| 6-3 | | CaO—MgO—TiO$_2$ ceramics | Hydrogen peroxide (1), acetic acid (0.3), ammonia (0.8) |
| 6-4 | | CaO—MgO—TiO$_2$ ceramics | Hydrogen peroxide (1), ammonia (0.5) |

TABLE 6

| No. | | Chelating reagent* | Ra(nm) |
|---|---|---|---|
| 6-1 | ○ | — | 0.8 |
| 6-2 | ● | — | 5.0 |
| 6-3 | | Bismuthiol II(1/5000) | 12.5 |
| 6-3 | | ($C_8H_5KN_2S_3$) | |
| 6-4 | | Citric acid(1/20) | 11.0 |

EXAMPLE 7

Fifty parts by weight calcium carbonate with an average grain particle diameter of 3.5 μm and 4 parts by weight magnesium carbonate with an average grain particle diameter of 4.0 μm as raw material A comprising the diffusing component and 46 parts by weight titanium oxide with an average grain particle diameter of 0.8 μm as raw material B comprising the component to which the diffusing component will diffuse were weighed out and then a CaO—MgO—TiO$_2$ ceramics for sliding members was made by powder metallurgy by mixing, pre-baking, crushing molding, and sintering. The main products and their amounts at this time are shown in Table 7.

Moreover, once a specific surface of the abovementioned ceramics was polished to a mirror finish, chemical etching for 3 minutes at a temperature of 50° C. was performed using an etching solution with a composition of an aqueous solution comprising hydrogen peroxide, ammonia, and acetic acid and a composition ratio in terms of 100% purity of 1:1:0.25.

The state of the sliding surface was checked using an AFM (intra-atomic force microscope Nanoscope 3, made by Digital Instruments) and the ratio of the total surface area of the surface of the tips of each protrusion to the total surface area of the bearing surface Sa and the average diameter of the surface of the tips of the protrusions Da were determined. The determination results are shown in Table 7.

Comparison 4

Fifty-eight parts by weight calcium carbonate with an average grain particle diameter of 1.5 μm as raw material A and 42 parts by weight titanium oxide with an average grain particle diameter of 1.5 μm as raw material B were weighed out and a ceramics for sliding members was obtained by the same powder metallurgy means as in Example 7. The main products and their amounts at this time are shown in Table 7.

As is clear from Table 7, the magnetic head of the present invention uses a ceramics with at least two compound phases having different etching properties in chemical etching and in particular it is possible to make the tip of each protrusion in the irregular surface that is formed in a bearing surface that has been given a mirror finish an almost flat surface and to obtain good air flow between [the sliding member and] the magnetic recording medium during sliding with a CaO—MgO—TiO$_2$ ceramics, and therefore, both good magnetic properties and sliding performance are realized with high-density FDD and HDD where the magnetic recording medium turns at high speed.

TABLE 7

| | Amount produced (%) | |
|---|---|---|
| Product | Example 7 | Comparison |
| CaTiO$_3$ | 83 | 100 |
| CaTi$_2$O$_5$ | 1 | 0 |
| CaTi$_4$O$_9$ | 5 | 0 |
| MgTiO$_3$ | 3 | — |
| MgTi$_2$O$_5$ | 8 | — |
| Da(μm) | 5.0 | — |
| Sa(%) | 17 | — |

INDUSTRIAL APPLICABILITY

By means of the present invention, it is possible to form a surface with fine irregularities at the bearing surface of a sliding member and to make the tip of each protrusion of this surface with fine irregularities almost flat without any changes in the characteristics of the smooth surface of a core, which has been finished and ground to remove the lapping residue layer, by chemical etching with an etching solution consisting of an aqueous solution comprising oxidizer, acid and alkali once the magnetic head has been assembled and the core member and bearing surface of the sliding member, which face the magnetic recording medium, have been polished to a mirror finish to bring the average roughness Ra to, for instance, 2.0 nm or less.

That is, it is possible to improve the flow of air between the bearing surface and recording medium during sliding with the magnetic head of the present invention, where the tip of each protrusion in the surface with fine irregularities is almost flat, and in particular, it is possible to obtain both good magnetic properties and sliding properties in high-density FD drives where the recording medium turns at a high speed.

Moreover, by controlling the average grain particle diameter of raw materials for both the diffusing component that diffuses during pre-baking and sintering and the component to which the diffusing component diffuses as needed and making these into a ceramics by powder metallurgy, it is possible to obtain a ceramics for sliding members where there are at least two compound phases with different etching properties present.

Consequently, ceramics that are mixtures of several types of compound phases have different etching properties owing to the stability of the chemical bonds of each of the compound phases and when the bearing surface that has been polished to a mirror finish is etched, an irregular rough surface where the tip of each protrusion is almost flat can be easily formed, resulting in good air flow during sliding at the sliding surface where the sliding member and magnetic recording medium face one another and improving sliding properties of the ceramics for sliding members.

Moreover, it is possible to improve the efficiency of the desired surface modification by adding a specific amount of chelating reagent to the etching solution of the present invention and performing etching so that cations generated during etching will be captured in the solution by the chelating reagent.

What is claimed is:

1. A magnet head which includes a sliding member made from a polycrystalline nonmagnetic ceramic formed of at least two or more compound phases with different etching properties and a core member, wherein a center line average roughness Ra of a bearing surface of the core member that faces a magnetic recording medium is 3.0 nm or less, the sliding member consists of a surface with fine irregularities that the center line average roughness Ra of the bearing surface that faces the magnetic recording medium exceeds 3.0 nm, and a tip of each protrusion is an almost flat surface, while the average diameter Da of the surface of the tip of each protrusion is 2 $\mu$m to 10 $\mu$m, and furthermore a height of the surface of the core member is provided co-planar with a height of a substantially flat surface at said tip of each protrusion of the sliding member.

2. A magnetic head according to claim 1, wherein the ratio Sa of the total surface area of the tip surface of each protrusion to the total surface area of the bearing surface of the sliding member is 10 to 70%.

3. A magnetic head according to claim 1, wherein the bearing surface of the core member facing the magnetic recording medium has a center line average roughness Ra of 2.0 nm or less and the lapping residue layer bas been removed.

4. A magnetic head according to claim 1, wherein the polycrystalline nonmagnetic ceramic is any one of CaO—$TiO_2$, AlTiC, MnO—NiO, $CaTiO_3$—NiO, CaO—MgO—$TiO_2$, CaO—MgO—$TiO_2$—$SiO_2$, and CaO—MgO—$TiO_2$—$SiO_2$—$Al_2O_3$.

5. A method of producing a magnetic head, comprising the steps of providing a magnetic head with a sliding member made from a polycrystalline nonmagnetic ceramic that has at least two or more compound phases with different etching properties and a core member, and contacting a bearing surface of said sliding member facing a magnetic recording medium with an aqueous etching solution formed of oxidizer, acid and alkali to provide fine irregularities and protrusions having almost flat surfaces in said bearing surface.

6. A method of producing a magnetic head, comprising the steps of providing a magnetic head with a sliding member made from a polycrystalline nonmagnetic ceramic that has at least two or more compound phases with different etching properties and a core member, and contacting a bearing surface of said sliding member facing a magnetic recording medium with an etching solution and chelating agent to provide fine irregularities and protrusions having almost flat surfaces in said bearing surface.

7. A method of producing a magnetic head according to claim 6, wherein the etching solution consists of a solution containing oxidizer, a solution containing oxidizer and acid, a solution containing oxidizer and alkali, or a solution containing oxidizer and acid and alkali.

8. A method of producing a magnetic head according to claim 5, or 6, wherein a center line average roughness Ra of the bearing surface of the core member that faces the magnetic recording medium is 3.0 nm or less, the sliding member consists of the surface with fine irregularities that the center line average roughness Ra of the bearing surface that faces the magnetic recording medium exceeds 3.0 nm, and the tip of each protrusion is an almost flat surface, while an average diameter Da of the surface of the tip of each protrusion is 2 $\mu$m to 10 $\mu$m, and a height of the surface of the core member is provided co-planar with a height of the almost flat surface of each said tip of each protrusion of the sliding member.

9. A method of producing a magnetic head according to claim 5 or 6, whereby chemical etching is performed after the bearing surface of the sliding member facing the magnetic recording medium and the core member have been polished to an average surface roughness Ra of 3.0 nm or less.

10. A method of producing a magnetic head according to claim 9, whereby 2-step lapping is performed using diamond free abrasive grains for the polishing means to obtain an average roughness of the core member Ra of 2.0 nm or less and remove the lapping residue layer.

11. A method of producing a magnetic head according to claim 10, whereby the average particle diameter of the diamond abrasive grains during the second lapping of the polishing means is 0.5 $\mu$m or less.

12. A method of producing a magnetic head according to claim 5 or 6, whereby the polycrystalline nonmagnetic ceramic is made from starting powders consisting of at least raw material A as a diffusing component that diffuses during heating and raw material B as a component to which the diffusing component will diffuse during heating and whereby said ceramic is made by a powder metallurgical method, with the average grain particle diameter of raw powder A being greater than that of raw material B.

13. A method of producing a magnetic head according to claim 12, wherein the average grain particle diameter of raw material A is at least 2-times that of raw material B.

14. A method of producing a magnetic head according to claim 12, whereby raw material A is at least one of CaO, $Al_2O_3$, MnO, NiO, MgO and/or derivatives of said oxides, and raw material B is at least one of $TiO_2$, $Al_2O_3$, $SiO_2$, C and/or derivatives of said oxides and elements, provided that raw materials A and B are not the same.

* * * * *

UNITED STATES PATENT AND TRADEMARK OFFICE
CERTIFICATE OF CORRECTION

PATENT NO. : 6,411,464 B1
DATED : June 25, 2003
INVENTOR(S) : Fujii et al.

It is certified that error appears in the above-identified patent and that said Letters Patent is hereby corrected as shown below:

Title page,
Item [30], should read:
-- [30]  Foreign Application Priority Data
Apr. 1, 1999   (JP).................................11-94775
Jul. 24, 1998   (JP).................................10-225428
Nov. 25, 1998   (JP).................................10-334498
Aug. 31, 1998   (JP).................................10-262399 --

Signed and Sealed this

Thirtieth Day of December, 2003

JAMES E. ROGAN
*Director of the United States Patent and Trademark Office*